(12) United States Patent
Tomita

(10) Patent No.: US 10,191,707 B2
(45) Date of Patent: Jan. 29, 2019

(54) DISPLAY APPARATUS, DISPLAY SYSTEM, AND CONTROL METHOD FOR DISPLAY APPARATUS

(71) Applicant: Seiko Epson Corporation, Tokyo (JP)

(72) Inventor: Kenichiro Tomita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 162 days.

(21) Appl. No.: 15/056,811

(22) Filed: Feb. 29, 2016

(65) Prior Publication Data

US 2016/0259609 A1    Sep. 8, 2016

(30) Foreign Application Priority Data

Mar. 5, 2015 (JP) .................................. 2015-043270

(51) Int. Cl.
| | |
|---|---|
| *H04L 12/26* | (2006.01) |
| *G06F 3/14* | (2006.01) |
| *H04W 48/16* | (2009.01) |
| *H04W 48/20* | (2009.01) |
| *H04W 84/12* | (2009.01) |

(52) U.S. Cl.
CPC .............. *G06F 3/14* (2013.01); *H04W 48/16* (2013.01); *H04W 48/20* (2013.01); *G09G 2370/025* (2013.01); *G09G 2370/16* (2013.01); *H04W 84/12* (2013.01)

(58) Field of Classification Search
CPC ..... H04W 8/005; H04W 76/04; H04W 48/16; G08C 2201/20; G06F 3/14
See application file for complete search history.

(56) References Cited

U.S. PATENT DOCUMENTS

| | | | | |
|---|---|---|---|---|
| 2002/0169977 | A1* | 11/2002 | Chmaytelli | ......... H04L 63/0861 726/7 |
| 2005/0120096 | A1* | 6/2005 | Rekimoto | .............. G08C 17/02 709/220 |
| 2005/0197062 | A1* | 9/2005 | Sprogis | .............. G06K 7/10079 455/41.2 |
| 2008/0030304 | A1* | 2/2008 | Doan | .................. H04M 1/7253 340/10.1 |
| 2009/0323608 | A1* | 12/2009 | Adachi | ................. H04W 48/18 370/329 |
| 2010/0068997 | A1 | 3/2010 | Dunko | |

(Continued)

FOREIGN PATENT DOCUMENTS

| | | |
|---|---|---|
| JP | 2009-267578 A | 11/2009 |
| JP | 2012-502554 A | 1/2012 |

(Continued)

*Primary Examiner* — Kevin C. Harper
(74) *Attorney, Agent, or Firm* — ALG Intellectual Property, LLC

(57) ABSTRACT

A display apparatus includes a display section, a wireless communication section configured to perform wireless connection to an external apparatus using first connection information that can be acquired from an external radio tag, and a storing section configured to store second connection information different from the first connection information. The wireless communication section is capable of performing the wireless connection to the external apparatus or another external apparatus using the second connection information. The second connection information is changeable.

9 Claims, 7 Drawing Sheets

(56) References Cited

U.S. PATENT DOCUMENTS

| | | | |
|---|---|---|---|
| 2011/0122835 A1* | 5/2011 | Naito | H04W 76/023 370/329 |
| 2013/0034046 A1 | 2/2013 | Ishii et al. | |
| 2013/0223278 A1 | 8/2013 | Inada | |
| 2014/0306806 A1* | 10/2014 | Martinez de Velasco Cortina | G06K 7/10366 340/10.1 |
| 2014/0313542 A1* | 10/2014 | Benchorin | G06F 3/1292 358/1.15 |

FOREIGN PATENT DOCUMENTS

| JP | 2013-038498 A | 2/2013 |
|---|---|---|
| JP | 2013-046290 A | 3/2013 |
| JP | 2014-171090 A | 9/2014 |
| JP | 2016-161893 A | 9/2016 |

\* cited by examiner

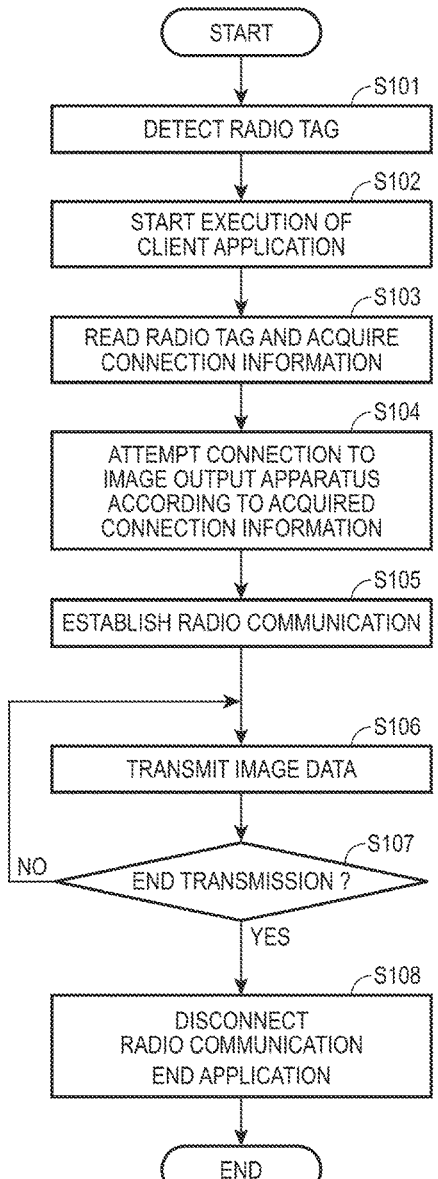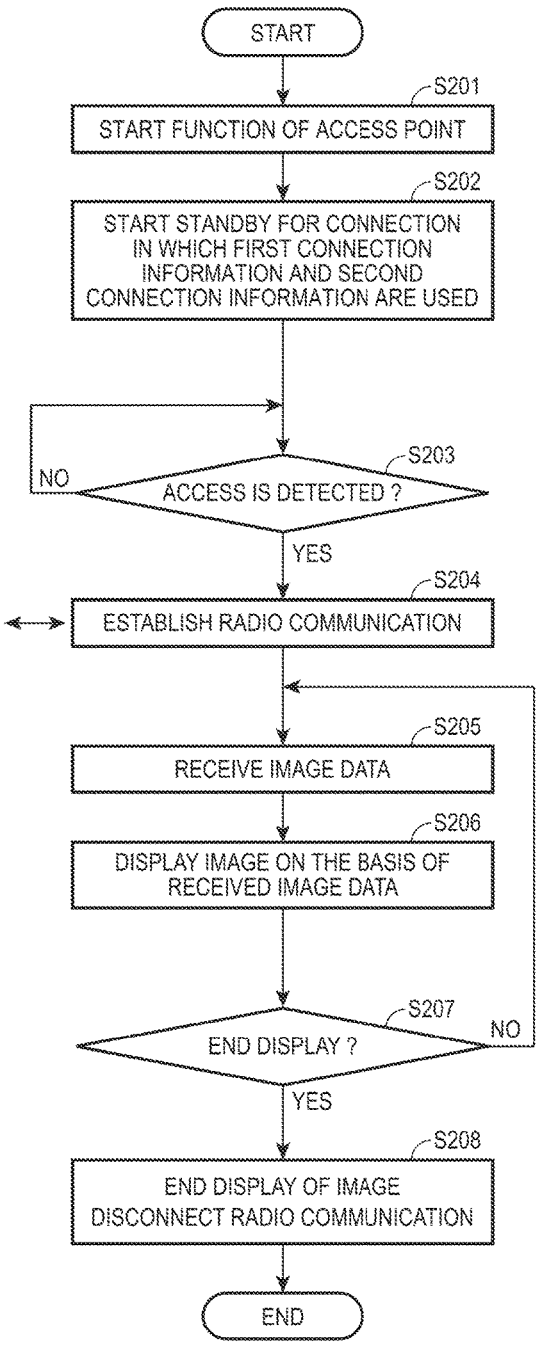
FIG. 7A                    FIG. 7B

DISPLAY APPARATUS, DISPLAY SYSTEM, AND CONTROL METHOD FOR DISPLAY APPARATUS The entire disclosure of Japanese Patent Application No. 2015-043270, filed Mar. 5, 2015, is expressly incorporated by reference herein.

BACKGROUND

1. Technical Field

The present invention relates to a display apparatus, a display system, and a control method for the display apparatus.

2. Related Art

There is known a technique for connecting an information processing apparatus such as a smart phone or a tablet terminal to a display apparatus such as a projector through a wireless LAN (Local Area Network). Further, there is known a technique for using near field communication (NFC) for establishment of wireless LAN connection. For example, JP-T-2012-502554 (Patent Literature 1) discloses a technique in which a portable communication apparatus detects transmission of the NFC to thereby detect the presence of the wireless LAN and facilitates connection to the wireless LAN.

In the technique described in Patent Literature 1, there is a problem in that, when connection information of a display apparatus is changed, it is difficult to share the connection information.

SUMMARY

An advantage of some aspects of the invention is to provide a technique for, even when connection information of a display apparatus is changed, making it easy to share the connection information with other information processing apparatuses.

A display apparatus according to an aspect of the invention includes: a display section; a wireless communication section configured to perform wireless connection to an external apparatus using first connection information that can be acquired from an external radio tag; and a storing section configured to store second connection information different from the first connection information. The wireless communication section is capable of performing the wireless connection to the external apparatus or another external apparatus using the second connection information. The second connection information is changeable.

With the display apparatus according to this aspect of the invention, it is possible to enable the wireless connection by the first connection information that can be acquired from the external radio tag and change the second connection information used for the wireless connection.

The display apparatus according to the aspect of the invention may further include: a receiving section configured to receive an instruction for the change of the second connection information; and a changing section configured to change the second connection information on the basis of the instruction received by the receiving section. When the changing section changes the second connection information, the first connection information may not be changed.

With the display apparatus according to this aspect of the invention, it is possible to keep a state in which the external apparatus that acquires the first connection information from the external radio tag is capable of performing the wireless connection to the display apparatus.

In the display apparatus according to the aspect of the invention, when receiving an access from the external apparatus using the first connect information, the wireless communication section may function as an access point of a wireless LAN to perform the wireless connection to the external apparatus.

With the display apparatus according to this aspect of the invention, it is possible to provide the access point connectable to the external apparatus using the first connection information.

In the display apparatus according to the aspect of the invention, the wireless communication section may perform wireless LAN connection to the external apparatus as an access point using the first connection information and perform the wireless LAN connection to an external wireless LAN access point using the second connection information.

With the display apparatus according to this aspect of the invention, it is possible to connect the display apparatus to the external wireless LAN access point and it is possible to provide the access point connectable to the external apparatus using the first connection information.

In the display apparatus according to the aspect of the invention, the display section may be display an image based on image data received by the wireless communication section.

With the display apparatus according to this aspect of the invention, it is possible to display an image on the basis of image data transmitted by the external apparatus.

The display apparatus according to the aspect of the invention may further include a radio tag configured to retain the first connection information.

With the display apparatus according to this aspect of the invention, the first connection information that can be acquired from the external radio tag is retained in the radio tag included in the display apparatus. Therefore, it is possible to more easily perform the wireless connection using the first connection information.

A display system according to another aspect of the invention includes: a display apparatus; and an information processing apparatus. The display device includes: a display section; a first wireless communication section configured to perform wireless connection to the information processing apparatus using first connection information; and a storing section configured to store second connection information different from the first connection information. The display section displays an image based on image data received from the information processing apparatus by the first wireless communication section. The first wireless communication section is capable of performing the wireless connection to the information processing apparatus using the second connection information. The second connection information is changeable. The information processing apparatus includes: a wireless reader/writer configured to read the first connection information from a radio tag; a second wireless communication section configured to perform wireless connection to the display apparatus using the first connection information read by the wireless reader/writer; and a transmitting section configured to transmit image data to the display apparatus with the second wireless communication section.

With the display system according to this aspect of the invention, it is possible to change the second connection information used for the wireless connection in a configuration in which the information processing apparatus can perform the wireless connection to the display apparatus and transmit image data.

A control method for a display apparatus according to still another aspect of the invention includes: performing, with a display apparatus including a display section, wireless connection to an external apparatus using first connection information that can be acquired from an external radio tag; performing the wireless connection to the external apparatus or another external apparatus using second connection information different from the first connection information; and changeably retaining the second connection information.

With the control method for the display apparatus according to this aspect of the invention, it is possible to enable the wireless connection by the first connection information that can be acquired from the external radio tag and change the second connection information used for the wireless connection.

BRIEF DESCRIPTION OF THE DRAWINGS

The invention will be described with reference to the accompanying drawings, wherein like numbers reference like elements.

FIGS. 7A and 7B are flowcharts for explaining connection processing between the image output apparatus and the information processing apparatus.

DESCRIPTION OF EXEMPLARY EMBODIMENTS

1. Configuration

Figure 1:
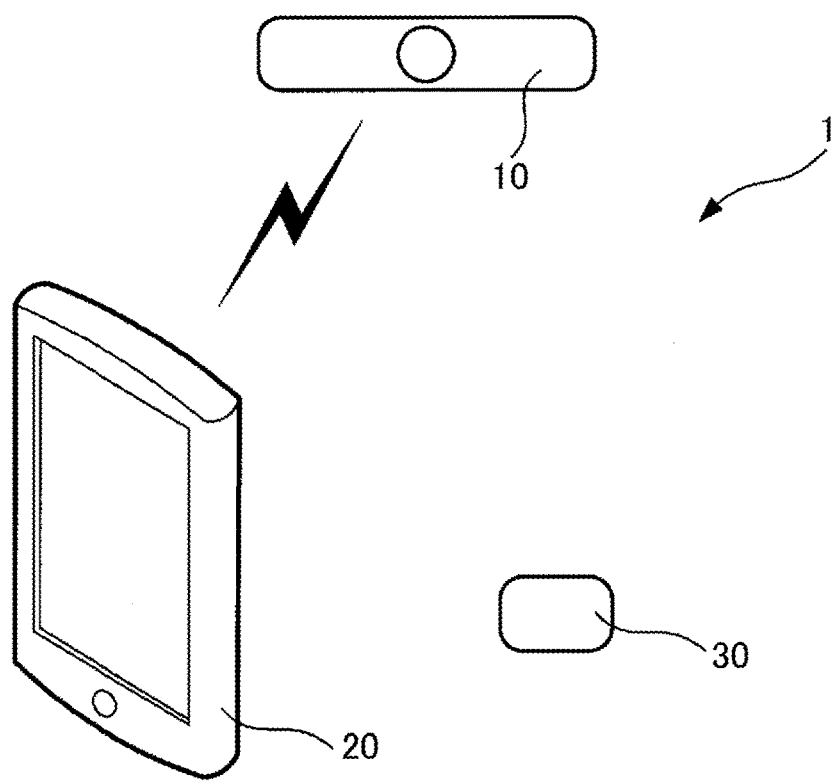
FIG. 1 is a diagram schematically showing the configuration of an information processing system according to an embodiment.

FIG. 1 is a diagram schematically showing the configuration of an information processing system 1 (a display system) according to an embodiment. The information processing system 1 includes an image output apparatus 10 (a display apparatus), an information processing apparatus 20, and a radio tag 30. The image output apparatus 10 is an apparatus that outputs an image or a video, for example, a projector. The information processing apparatus 20 is, for example, a smart phone. In the information processing system 1, the information processing apparatus 20 performs wireless connection to the image output apparatus 10 using information read from the radio tag 30. The image output apparatus 10 outputs an image received from the information processing apparatus 20 via the wireless connection. Note that the information processing system 1 may include a plurality of information processing apparatuses 20 and a plurality of radio tags 30. When a plurality of image output apparatuses 10 are distinguished from one another, subscripts are added to the reference numeral to describe the image output apparatuses 10 as, for example, image output apparatuses 10A, 10B, and the like. The same applies to the radio tag 30.

Figure 2:
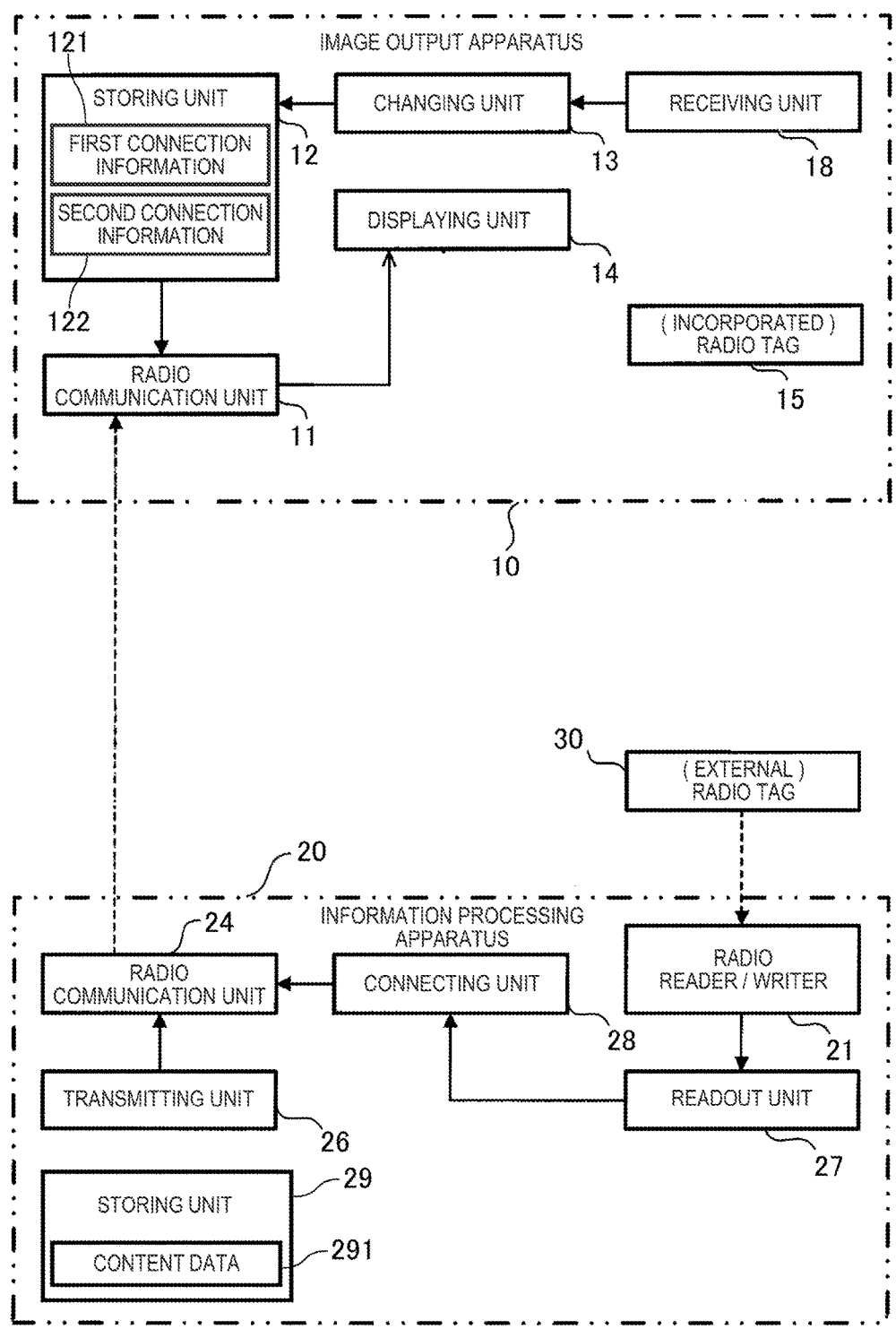
FIG. 2 is a diagram showing the functional configuration of the information processing system.

FIG. 2 is a diagram showing the functional configuration of the information processing system 1. In the following explanation, an example is explained in which the image output apparatus 10 is a display apparatus, more specifically, a projector that projects an image (a video).

The image output apparatus 10 includes a wireless communication unit 11 (a wireless communication section or a first wireless communication section), a storing unit 12 (a second-connection-information storing section), a changing unit 13 (a changing section), a displaying unit 14 (a display section), a receiving unit 18 (a receiving section).

The wireless communication unit 11 performs wireless communication of a first system with an external apparatus (e.g., the information processing apparatus 20). The first system is a system conforming to a standard of so-called wireless LAN, for example, IEEE802.11 (including derived and developed standards such as IEEE802.11a, IEEE802.11b, IEEE802.11g, IEEE802.11n, and IEEE802.11ac). The wireless communication unit 11 provides, for example, a function of an access point of the wireless LAN.

The storing unit 12 stores connection information used when the wireless communication of the first system is performed. In this embodiment, the connection information stored by the storing unit 12 is first connection information 121 and second connection information 122. The first connection information 121 and the second connection information 122 are information necessary for establishing connection when communication of the wireless LAN is started. For example, the first connection information 121 and the second connection information 122 respectively include identifiers (Service Set Identifiers, SSIDs) and passphrases (passwords) of access points of the wireless LAN.

The changing unit 13 changes connection information stored in the storing unit 12. The first connection information 121 of the connection information stored by the storing unit 12 cannot be changed. In other words, the changing unit 13 changes the second connection information 122 stored in the storing unit 12. The receiving unit 18 receives an instruction for the change by the changing unit 13 and content of the second connection information 122 after the change. The receiving unit 18 receives an input of a user.

The displaying unit 14 displays a still image or a moving image (a video) on the basis of image data received by the wireless communication unit 11. In this example, the wireless communication unit 11 receives, using connection information matching the first connection information 121 or the second connection information 122 stored in the storing unit 12, a video from an external apparatus connected to the image output apparatus 10 by radio in the first system. The displaying unit 14 displays a video on the basis of image data received from the external apparatus via the wireless communication unit 11.

The radio tag 30 is energized by an electromagnetic wave output according to a second system and outputs a radio response signal. The second system is a system conforming to a standard of a so-called noncontact IC card technique or a near field communication (NFC), for example, ISO/IEC18092 (NFCIP-1), ISO/IEC14443, or ISO/IEC15693. In terms of comparison with a radio tag incorporated in the image output apparatus 10, the radio tag 30 can be regarded as an "externally attached" or "external" radio tag.

Note that the "radio tag" includes a tag generally called RFID (Radio Frequency Identifier) or IC tag and includes a radio tag of a so-called passive type, which can output information even if the radio tag does not include a power supply, and a radio tag of a so-called active type. In this embodiment, the radio tag 30, a radio tag 15, and a radio tag 108, which are radio tags of the passive type, are illustrated.

The information processing apparatus 20 includes a wireless reader/writer 21, a wireless communication unit 24 (a second wireless communication section), a transmitting unit 26 (a transmitting section), a readout unit 27, a connecting unit 28, and a storing unit 29.

The wireless reader/writer 21 performs wireless communication of the second system with the radio tag 30 to read out and write information. The wireless communication unit 24 performs wireless communication of the first system with the image output apparatus 10.

The readout unit 27 reads out, via the wireless reader/writer 21, connection information stored in the radio tag 30. The readout unit 27 sets the connection information read out from the radio tag 30 in the connecting unit 28. The connecting unit 28 performs wireless connection to the image output apparatus 10 via the wireless communication unit 24 using the connection information read out by the readout unit 27. The transmitting unit 26 transmits image data to the image output apparatus 10 connected by the connecting unit 28. The transmitting unit 26 is connected to the storing unit 29. The storing unit 29 stores content data 291 including a still image or a video. The content data 291 is transmitted by the transmitting unit 26. A data format of the content data 291 can be set to any format. The content data 291 may include sound data. The content data 291 is data for, for example, reproduction of a moving image file, slideshow reproduction of a presentation file, or slideshow reproduction of a plurality of still image files.

In this example, the image output apparatus 10 includes the radio tag 15 conforming to the near field communication of the second system. In terms of comparison with the externally attached ratio tag, the radio tag 15 can be regarded as an "incorporated" radio tag.

The wireless reader/writer 21 included in the information processing apparatus 20 can read connection information from not only the radio tag 30 but also the radio tag 15. In this case, the readout unit 27 sets the connection information read by the wireless reader/writer 21 in the connecting unit 28. In this way, the information processing apparatus 20 reads the connection information from the radio tag 15 or the radio tag 30 and performs wireless connection to the image output apparatus 10 with the radio communicating unit 24 according to the read connection information.

Figure 3:
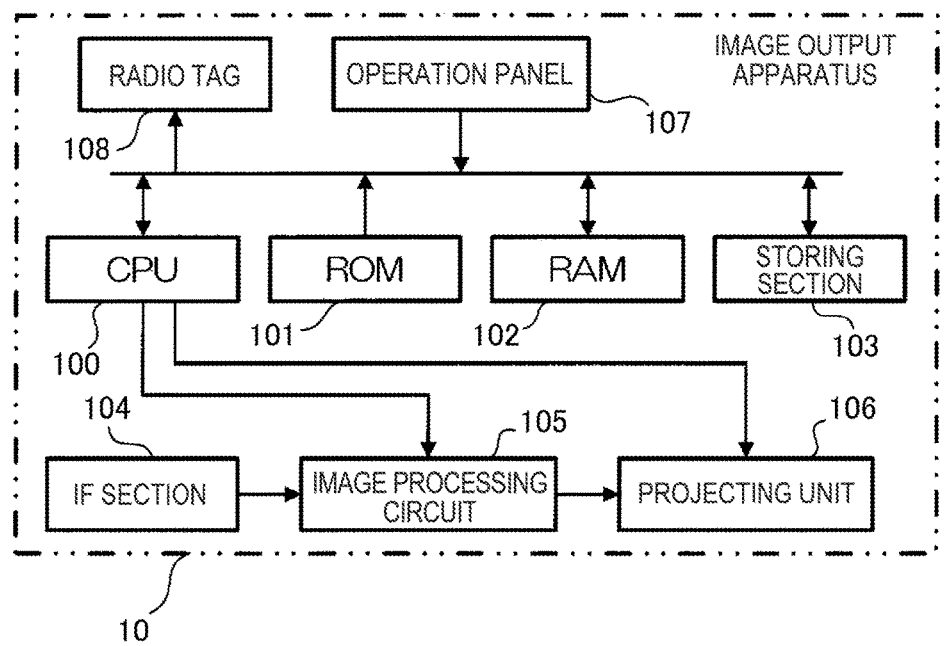
FIG. 3 is a diagram illustrating the hardware configuration of an image output apparatus.

FIG. 3 is a diagram illustrating the hardware configuration of the image output apparatus 10. As explained above, the image output apparatus 10 is the projector. The image output apparatus 10 includes a CPU (Central Processing Unit) 100, a ROM (Read Only Memory) 101, a RAM (Random Access Memory) 102, a storing section 103, an IF (InterFace) section 104, an image processing circuit 105, a projecting unit 106, an operation panel 107, and the radio tag 108.

The CPU 100 is a control device that controls sections of the image output apparatus 10. The ROM 101 is a nonvolatile storage device having stored therein various programs (hereinafter referred to as "control programs") and data. The RAM 102 is a volatile storage device that stores data and functions as a work area used by the CPU 100 in executing processing.

The storing section 103 is a nonvolatile storage device that stores data including connection information and includes, for example, a flash memory, an HDD (Hard Disk Drive), or an SSD (Solid State Drive). In this example, the storing section 103 may store data and computer programs for realizing various functions for, for example, projecting a video transmitted from the information processing apparatus 20 connected by the wireless LAN. The storing section 103 functions as the storing unit 12 (FIG. 1) and stores the first connection information 121 and the second connection information 122.

The IF section 104 is an interface that mediates exchange of signals or data between the image output apparatus 10 and an external apparatus (e.g., the information processing apparatus 20) functioning as a video source. The IF section 104 includes a terminal for exchanging signals or data with the external apparatus (e.g., a VGA terminal, a USB terminal, a wired LAN interface, an S terminal, an RCA terminal, or an HDMI (High-Definition Multimedia Interface: registered trademark)) and a wireless LAN interface.

The wireless LAN interface can cause the image output apparatus 10 to function as an access point of the wireless LAN. The wireless LAN interface can perform connection to an external access point of the wireless LAN as a client.

The image processing circuit 105 applies predetermined image processing to a video signal input thereto (hereinafter referred to as "input video signal"). The projecting unit 106 projects an image on a screen according to the video signal applied with the image processing. The projecting unit 106 includes a light source, a light modulator, and an optical system and a driving circuit for the light source, the light modulator, and the optical system (none of which are shown in the figure). The light source includes a lamp such as a high-pressure mercury lamp, a halogen lamp, or a metal halide lamp or a solid-state light source such as an LED (Light Emitting Diode) or a laser diode. The light modulator is a device that modulates, according to the video signal, light radiated from the light source. The light modulator includes, for example, liquid crystal panels of a transmission type. The optical system is an element that projects the light modulated by the light modulator on the screen. The optical system includes, for example, a lens and a prism. In this example, the light source and the light modulator are provided for each color component. Specifically, the light source and the light modulator are individually provided for each of the three primary colors of red, green, and blue. Lights modulated by the liquid crystal panels are combined by the optical system and projected on the screen. Note that the light modulator maybe configured by liquid crystal panels of a reflection type or mirror devices.

The operation panel 107 is an input device with which the user inputs an instruction to the image output apparatus 10. The operation panel 107 includes, for example, a keypad, buttons, or a touch panel. The radio tag 108 is a radio tag conforming to the second system. The radio tag 108 corresponds to the "incorporated" radio tag 15 in FIG. 2.

Figure 4:
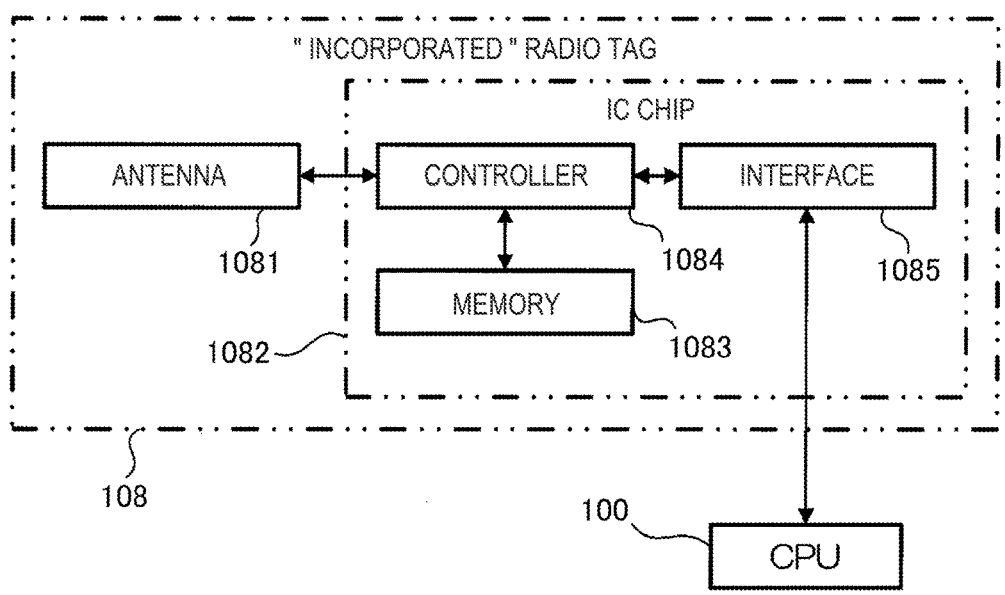
FIG. 4 is a diagram illustrating the configuration of a radio tag.

FIG. 4 is a diagram illustrating the configuration of the "incorporated" radio tag 108. The radio tag 108 includes an antenna 1081 and an IC chip 1082. The antenna 1081 receives a magnetic field, that is, an electromagnetic wave (a carrier wave) output from a wireless reader/writer. When the antenna 1081 receives the magnetic field, an electric current is generated in the antenna 1081 by electromagnetic induction. The IC chip 1082 is started by the electric current.

The IC chip 1082 includes a memory 1083, a controller 1084, and an interface 1085. The memory 1083 is a nonvolatile storage device that stores information. In this example, the memory 1083 stores connection information for performing wireless connection to the image output apparatus 10. The interface 1085 is a wired interface that mediates exchange of data with the CPU 100. In this example, connection information designated by the CPU 100 is written in the memory 1083.

When the electric current flows in the antenna 1081, a magnetic field (a demagnetizing field) in a direction opposite to the direction of the magnetic field received by the wireless reader/writer is generated. The controller 1084 started by the electric current flowing in the antenna 1081 modulates the demagnetizing field to include the connection information stored in the memory 1083. The wireless reader/writer reads the modulated demagnetizing field as a data signal. That is, the antenna 1081 is a radio response section that outputs a radio response signal.

Referring back to FIG. 3, the wireless LAN interface included in the IF section 104 is an example of the wireless communication unit 11. The storing section 103 is an example of the storing unit 12. The CPU 100 that is executing a projection program is an example of the modulating unit 13. The projecting unit 106 is an example of the displaying unit 14. The operation panel 107 is an example of the receiving unit 18.

Figure 5:
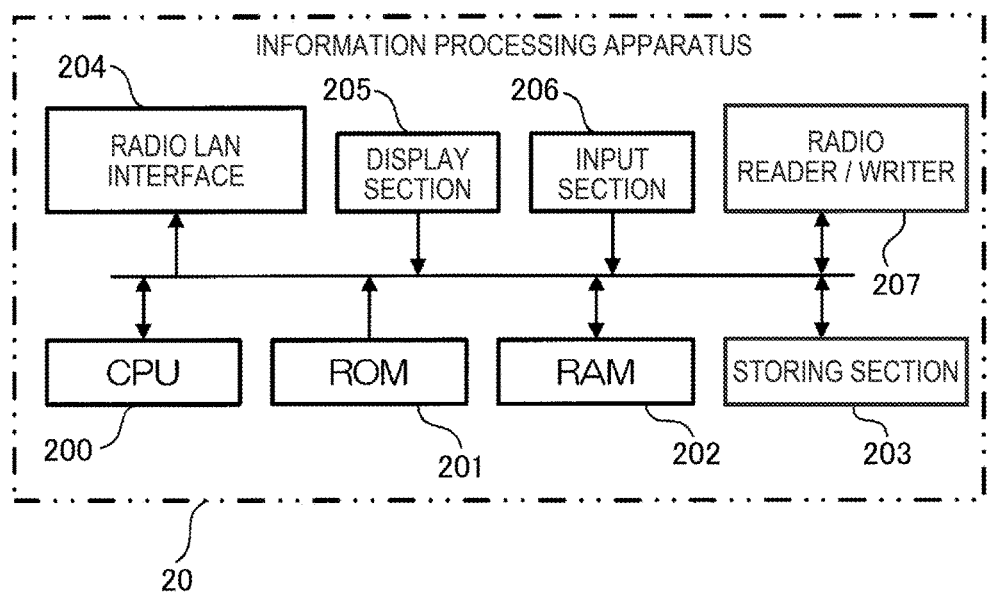
FIG. 5 is a diagram illustrating the hardware configuration of an information processing apparatus.

FIG. 5 is a diagram illustrating the hardware configuration of the information processing apparatus 20. In this example, the information processing apparatus 20 is a smart phone. The information processing apparatus 20 includes a CPU 200, a ROM 201, a RAM 202, a storing section 203, a wireless LAN interface 204, a display section 205, an input section 206, and a wireless reader/writer 207.

The CPU 200 is a control device that controls the sections of the information processing apparatus 20. The ROM 201 is a nonvolatile storage device having stored therein various computer programs and data. The RAM 202 is a volatile storage device that stores data. The RAM 202 functions as a work area used by the CPU 200 in executing processing. The storing section 203 includes a nonvolatile storage device that stores data and computer programs, for example, an HDD (Hard Disk Drive) or an SSD (Solid State Drive). In this example, the storing section 203 has stored therein an operating system (hereinafter referred to as "OS") and an application program (hereinafter referred to as "client application") for transmitting a video to the image output apparatus 10 via wireless LAN connection.

The wireless LAN interface 204 performs wireless LAN communication with other apparatuses (e.g., the image output apparatus 10). The display section 205 includes a device that displays information, for example, an LCD (Liquid Crystal Display). The input section 206 includes a device that inputs an instruction and information to the information processing apparatus 20, for example, a touch screen or a keypad.

The wireless reader/writer 207 corresponds to the wireless reader/writer 21. The wireless LAN interface 204 is an example of the wireless communication unit 24. The CPU 200 that is executing the client application is an example of the transmitting unit 26, the readout unit 27, and the connecting unit 28. The storing section 203 functions as the storing unit 29 and stores the content data 291 (FIG. 1).

Figure 6:
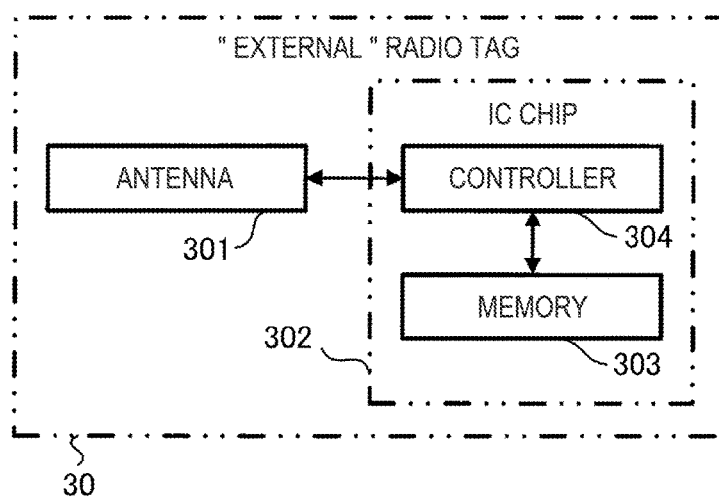
FIG. 6 is a diagram illustrating the hardware configuration of the radio tag.

FIG. 6 is a diagram illustrating the hardware configuration of the "external" radio tag 30. The radio tag 30 includes an antenna 301 and an IC chip 302. The antenna 301 receives a magnetic field, that is, an electromagnetic wave (a carrier wave) output from a wireless reader/writer. When the antenna 301 receives the magnetic field, an electric current is generated in the antenna 301 by electromagnetic induction. The IC chip 302 is started by the electric current.

The IC chip 302 includes a memory 303 and a controller 304. The memory 303 is a nonvolatile storage device that stores information. In this example, the memory 303 stores connection information for performing wireless connection to the image output apparatus 10.

When the electric current flows in the antenna 301, a magnetic field (a demagnetizing field) in a direction opposite to the direction of the magnetic field received by the wireless reader/writer is generated. The controller 304 started by the electric current flowing in the antenna 301 modulates the demagnetizing field to include the connection information stored in the memory 303. The wireless reader/writer reads the modulated demagnetizing field as a data signal.

2. Operation

The operation of the information processing system 1 is explained. In particular, processing in which the information processing apparatus 20 establishes wireless LAN connection to the image output apparatus 10 and changes the second connection information is explained. A situation explained below is assumed as an example. The image output apparatus 10 (the projector) is set on a ceiling of a conference room. The radio tag 30 is stuck on a desk in the conference room. Connection information of the image output apparatus 10 is stored in the radio tag 30. A user carries the information processing apparatus 20, which the user uses every day, into the conference room and projects a video from the image output apparatus 10 using the information processing apparatus 20 as a video source.

2-1. Connection of the Image Output Apparatus 10 and the Information Processing Apparatus 20

FIGS. 7A and 7B are flowcharts for explaining connection processing of the image output apparatus 10 and the information processing apparatus 20. In the following explanation, software such as a client application is described as an entity of processing. This means that a hardware element such as the CPU 200 executing the computer program performs the processing in cooperation with the other hardware elements. FIG. 7A shows the operation of the information processing apparatus 20. FIG. 7B shows the operation of the image output apparatus 10.

When the user performs operation for holding the information processing apparatus 20 over the radio tag 30, the information processing apparatus 20 detects the radio tag 30 (step S101). Specifically, the distance between the wireless reader/writer 207 and the antenna 301 decreases and an electric current is induced in the antenna 301. The IC chip 302 is started by the electric current and outputs, as a data signal, connection information stored therein. In this example, the connection information stored by the IC chip 302 is connection information corresponding to the first connection information 121 stored by the storing section 103. The connection information includes information used to establish wireless LAN connection to the image output apparatus 10, specifically, for example, an IP address of a network, an identification name and a passphrase (a password) of the image output apparatus 10, and an SSID and a passphrase (a password) of the image output apparatus 10. Therefore, the connection information stored by the IC chip 302 may be information same as the first connection information 121. When the image output apparatus 10 uses the first connection information 121, the connection information 121 may be information for enabling wireless connection to the image output apparatus 10 and different from the first connection information 121. Note that these kinds of information may be encrypted. The image output apparatus 10 and the radio tag 30 may be sold as a set in a state in which these kinds of information are written in the radio tag 30. The information may be written in the radio tag 30 later to be suitable for connection to the image output apparatus 10. Further, it is also possible that a character string or a number or composite string information of the character string and the number is printed on the radio tag 30, the user is asked to register these kinds of information in the image output apparatus 10 at the time of first use, and the image output apparatus 10 generates connection information from these kinds of registered information. The first connection information 121 cannot be changed by user operation. However, association of the image output apparatus 10 and the radio tag 30 by registration and deletion of these kinds of information can be generated.

The information processing apparatus 20 is triggered by detection of the radio tag 30 to start execution of a client application associated with reading of the radio tag 30 (step S102). The client application executes a reading operation for the radio tag 30 and acquires connection information from the radio tag 30 (step S103). That is, the client application extracts connection information from a data signal read via the wireless reader/writer 207. The client application stores the extracted connection information to the RAM 202. Note that, before performing the operation for holding the information processing apparatus 20 over the radio tag 30, the user may start the client application.

The client application attempts wireless LAN connection to a wireless LAN access point specified by an SSID included in the acquired connection information, that is, the image output apparatus 10 (step S104). For example, the client application broadcasts, with a function of the client application, from the wireless LAN interface 204, the SSID included in the connection information acquired in step S103 and detects a response from the access point. Alternatively, the client application selects, from a signal of the wireless LAN receivable by the wireless LAN interface 204, a signal corresponding to the SSID included in the connection information acquired in step 5103 and performs a response. With these methods or other methods, the client application of the information processing apparatus 20 attempts connection to the access point.

On the other hand, when started, the image output apparatus 10 starts execution of a function of the wireless LAN access point (step S201). That is, the image output apparatus 10 starts a function of establishing wireless connection in response to a request of connection from the wireless LAN client and providing wireless LAN connection.

The image output apparatus 10 can execute the function of the access point for both of the first connection information 121 and the second connection information 122 stored in the storing section 103. That is, the image output apparatus 10 can execute, independently from each other, wireless LAN connection in which the SSID and the passphrase included in the first connection information 121 are used and wireless LAN connection in which the SSID and the passphrase included in the second connection information 122 are used. This function is a function known as a so-called multi-SSID function. The image output apparatus 10 reads out the first connection information 121 and the second connection information 122 from the storing section 103 and starts a state in which the image output apparatus 10 stands by for the wireless LAN connection in which these kinds of connection information are used (step S202).

The image output apparatus 10 stays on standby until the image output apparatus 10 detects an access in which the SSID and the passphrase of the first connection information 121 or the SSID and the passphrase of the second connection information 122 are used (No in step S203). During the standby, the image output apparatus 10 may broadcast a signal based on the SSID of the first connection information 121 or broadcast a signal based on the SSID of the second connection information 122 with the IF section 104. Alternatively, the image output apparatus 10 may attempt, with the IF section 104, reception of a signal for designating the SSID included in the first connection information 121 or the second connection information 122.

If the information processing apparatus 20 attempts wireless connection (step S104) and the image output apparatus 10 detects this access (Yes in step S203), the image output apparatus 10 establishes wireless LAN connection (step S204). That is, a control program of the image output apparatus 10 establishes wireless LAN connection to an external apparatus (in this example, the information processing apparatus 20) connected to the image output apparatus 10 using connecting information matching the connection information stored in the storing section 103. The information processing apparatus 20 also establishes wireless LAN connection (step S105). In steps S105 and S204, information necessary for the wireless LAN connection is transmitted and received between the image output apparatus 10 and the information processing apparatus 20. The transmitted and received information is, for example, information for designating a MAC (Media Access Control) address, an IP (Internet Protocol) address, a network name, a node name, a passphrase, and a frequency channel.

Thereafter, the information processing apparatus 20 transmits the content data 291 stored in the storing section 203 to the image output apparatus 10 (step S106). At every predetermined time or every time a predetermined amount of data is transmitted, the information processing apparatus 20 determines whether to end the transmission (step S107). If determining not to end the transmission (No in step S107), the information processing apparatus 20 continues the transmission in step S106. If determining to end the transmission (Yes in step S107), the information processing apparatus 20 disconnects the wireless connection to the image output apparatus 10 and ends the client application (step S108). Note that the information processing apparatus 20 may transmit another content data 291 after the transmission of the content data 291 without ending the transmission.

On the other hand, the image output apparatus 10 receives the content data 291 transmitted by the information processing apparatus 20 (step 5205) and projects (displays) an image based on the received content data 291 on the screen (step S206). At every predetermined time or every time a predetermined amount of data is received, the image output apparatus 10 determines whether to end the display (step S207). If determining not to end the display (No in step S207), the image output apparatus 10 returns to step S205. If determining to end the display (Yes in step S207), the image output apparatus 10 ends the display of the image, disconnects the wireless connection to the information processing apparatus 20 (step S208), and ends the operation.

In the operation shown in FIGS. 7A and 7B, the image output apparatus 10 may set an upper limit in the number of information processing apparatuses 20 connecting as video sources by wireless LAN simultaneously. For example, the image output apparatus 10 may limit the number of information processing apparatuses 20 connecting as video source by wireless LAN connection to one. When a certain information processing apparatus 20 functions as a video source to perform wireless LAN connection to the image output apparatus 10, if another information processing apparatus 20 requests wireless LAN connection to perform as video sources, the image output apparatus 10 may switch the video source to the information processing apparatus 20 connected anew. Alternatively, when a predetermined condition is satisfied (e.g., when a predetermined instruction is input), the image output apparatus 10 may switch the video source to the information processing apparatus 20 connected anew.

The determination in steps S107 and S207 is not limited to the flow control. For example, when an event for stopping the transmission of the video (e.g., an end of reproduction or an instruction for stopping reproduction by the user) occurs, the operation in steps S108 and S208 may be executed according to the event.

That is, when the radio tag 30 is not used, when the information processing apparatus 20 is connected to the image output apparatus 10 for the first time, connection information to connect by wireless LAN with the image output apparatus 10 needs to be input to the information processing apparatus 20. As one of methods of inputting the connection information to the information processing apparatus 20, there is a method in which the user directly inputs the connection information to the information processing apparatus 20. Specifically, the user operates a keyboard (which is a hardware keyboard in some cases and a software keyboard in other cases) to input an SSID and a character string of a passphrase (a password) to the client software. In this method, the user is requested to perform complicated operation. The information processing apparatus 20 sometimes cannot be connected because of an input mistake. In another example, there is a method in which the image output apparatus 10 projects an image (e.g., a QR code (registered trademark)) indicating connection information and the information processing apparatus 20 reads and decodes the image with a camera to thereby obtain the connection information. However, in this example, the image output apparatus 10 needs to perform processing for generating and projecting the image indicating the connection information. The information processing apparatus 20 needs to start software for reading the image, photograph the image with a camera, and decode the image into the connection information. When compared with the method in which the user directly inputs the connection information, likelihood of the input mistake and a labor of the user decrease. However, there is still room for improvement in that the user is requested to perform many kinds of operation.

On the other hand, in this embodiment, simply by holding the information processing apparatus 20 over the radio tag 30, it is possible to capture, into the information processing apparatus 20, the connection information to connect by wireless LAN with the image output apparatus 10. That is, it is possible to connect the information processing apparatus 20 to the image output apparatus 10 by radio with operation simpler than in the past. In this embodiment, it is explained above that the image output apparatus 10 is set on the ceiling. However, the image output apparatus 10 may be, for example, a portable type. In that case, in order to establish wireless communication, it is convenient to use the "incorporated" radio tag 15 in the image output apparatus 10 because the "external" radio tag 30 does not have to be carried together with the image output apparatus 10.

2-2. Update (Change) of Connection Information

In the assumption explained above, for example, an SSID of the projector set in the conference room is sometimes changed because of a management reason or the like. In such a case, if the SSID and the passphrase used by the image output apparatus 10 are changed, the SSID and the passphrase do not match the connection information stored in the radio tag 30. Therefore, work for updating the connection information of the radio tag 30 or work for replacing the radio tag 30 is necessary. In the information processing system 1, it is possible to change the connection information such as the SSID used by the image output apparatus 10 and continuously use the connection information stored in the radio tag 30.

Figure 8:
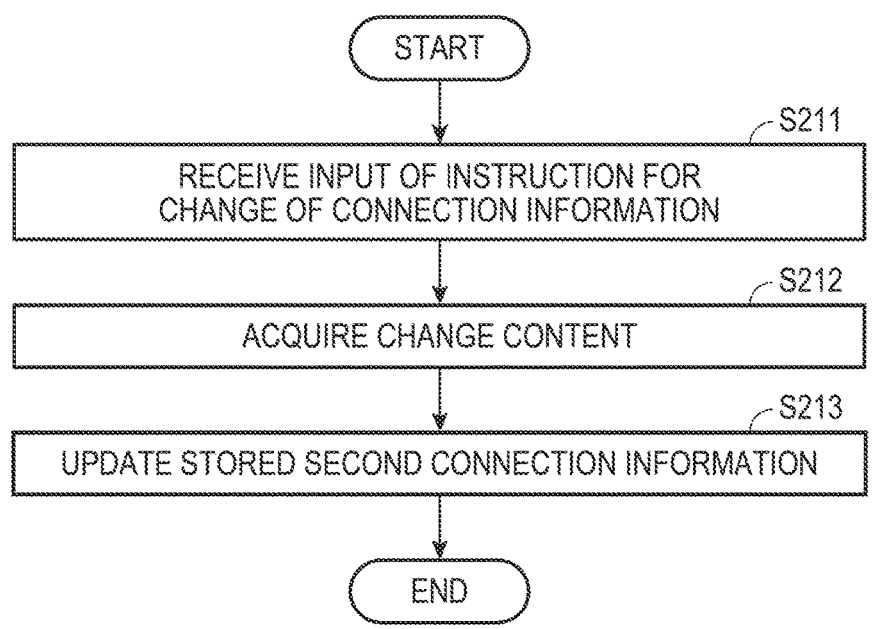
FIG. 8 is a flowchart for explaining changing processing for connection information.

FIG. 8 is a flowchart for explaining changing processing of the connection information stored by the image output apparatus 10. A flow of FIG. 8 is started, for example, when the user instructs a change of an SSID on a setting screen for a function of the image output apparatus 10.

A control program of the image output apparatus 10 receives an instruction for a change of the connection information by, for example, operation of the operation panel 107 (step S211). The image output apparatus 10 acquires a content of the change of the connection information input to the operation panel 107 (step S212). The image output apparatus 10 updates, on the basis of the acquired content of the change, the second connection information 122 stored in the storing section 203 (step S213).

The first connection information 121 is stored in the storing section 203 as information that cannot be updated. The first connection information 121 is, for example, data involving a flag or an attribute indicating that first connection information 121 cannot be updated. The first connection information 121 may be stored by hardware configuring the wireless LAN interface of the IF section 104 and may not be stored in the storing section 203. In both the configurations, a change of the first connection information 121 is not permitted by a function of the control program of the image output apparatus 10.

With this configuration, the image output apparatus maintains the first connection information 121 corresponding to the connection information stored by the radio tag 30 without changing the first connection information 121. Therefore, an apparatus such as the information processing apparatus 20 that reads the connection information from the radio tag 30 and performs a wireless LAN access can establish wireless communication with the image output apparatus 10. It is possible to maintain this state and change the second connection information 122. It is possible to perform a wireless LAN access using another kind of connection information.

3. Example of Use

Figure 9:
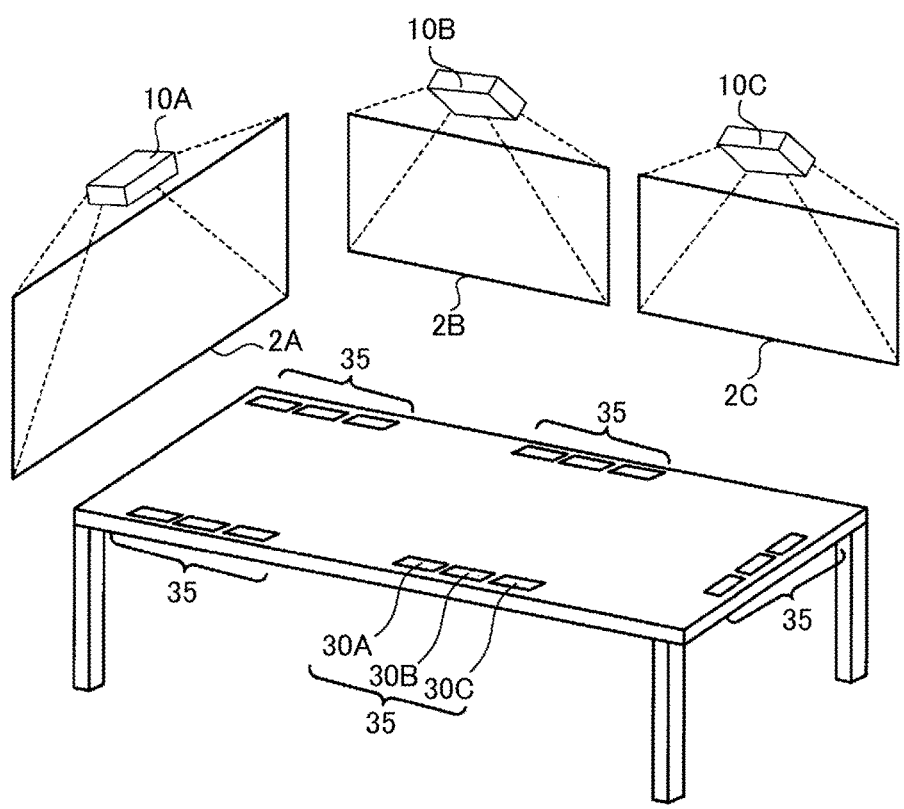
FIG. 9 is a diagram showing an example of use of the information processing system.

FIG. 9 is a diagram showing an example of use of the information processing system 1. In this example, the information processing system 1 is used in a certain conference room. In the conference room, three projectors (image output apparatuses 10A, 10B, and 10C) are set. The three projectors respectively project videos on different screens (screens 2A, 2B, and 2C). Tag sets 35 are stuck to a plurality of places on a desk in the conference room. Each of the tag sets 35 includes three radio tags (radio tags 30A, 30B, and 30C). Connection information of the image output apparatuses 10A, 10B, and 10C is respectively stored in the radio tags 30A, 30B, and 30C. The radio tags 30A, 30B, and 30C may respectively have exteriors (e.g., colors, marks, or character strings) indicating correspondence relations with the image output apparatuses. For example, the image output apparatuses 10A, 10B, and 10C may be painted in red, green, and blue (or labels of these colors are stuck to the image output apparatuses 10A, 10B, and 10C). The radio tags 30A, 30B, and 30C may be pained in red, green, and blue according to the colors of the image output apparatuses 10A, 10B, and 10C.

Five participants (users A to E; not shown in the figure) are attending a conference. The users own information processing apparatuses (information processing apparatuses 20A to 20C; not shown in the figure) incorporating wireless reader/writers. For example, when the user A is about to perform a presentation using the screen 2A, the user A holds the information processing apparatus 20A of the user A over the radio tag 30A of the tag set 35 near the seat of the user A. Then, wireless LAN connection is established between the information processing apparatus 20A and the image output apparatus 10A. The user A performs the presentation while reproducing a file of the presentation stored in the information processing apparatus 20A.

Subsequently, when the user B is about to perform a presentation using the screen 2B, the user B holds the information processing apparatus 20B of the user over the radio tag 30B of the tag set 35 near the seat of the user B. Then, wireless LAN connection is established between the information processing apparatus 20B and the image output apparatus 10B. The user B performs the presentation while reproducing a file of the presentation stored in the information processing apparatus 20B.

During the presentation and after the presentation of the user B, it is possible to keep the wireless LAN connection established between the information processing apparatus 20A and the image output apparatus 10A and the wireless LAN connection established between the information processing apparatus 20B and the image output apparatus 10B. When the user A desires to refer to the presentation of the user A in a discussion among the participants, the user A operates the information processing apparatus 20A to display a desired slide. The same applies to the user B.

Further, in this case, when the user C is about to perform a presentation using the screen 2A, the user C holds the information processing apparatus 20C of the user C over the radio tag 30A of the tag set 35 near the seat of the user C. Then, wireless LAN connection is established between the information processing apparatus 20C and the image output apparatus 10A. A video source of the information processing apparatus 20A is switched to the information processing apparatus 20C. The user C performs a presentation while reproducing a file of the presentation stored in the information processing apparatus 20C.

For example, in a system in which a so-called notebook PC (Personal Computer) to a projector by wire, when a video source is about to be switched, connection of a cable needs to be changed from a certain PC to another PC. On the other hand, in the information processing system 1, it is possible to switch the video source simply by holding the information processing apparatus 20 over the radio tag 30. However, if the notebook PC includes a wireless reader/writer, the notebook PC can function as an information processing apparatus.

In this way, with the information processing system 1, it is possible to more flexibly use the image output apparatus 10.

As explained above, the image output apparatus 10 of the information processing system 1 applied with the invention includes the projecting unit 106 functioning as the displaying unit 14 and the IF section 104 functioning as the wireless communication unit 11 for performing wireless connection to an external apparatus using the first connection information 121 that can be acquired from the external radio tag 30. The image output apparatus 10 includes the storing section 103 functioning as the storing unit 12 for storing the connection information for enabling the wireless connection with the IF section 104, that is, the second connection information 122 different from the first connection information 121. The image output apparatus 10 is capable of performing, with the IF section 104, wireless connection to the information processing apparatus 20 using the second connection information 122. The second connection information 122 is changeable. Therefore, it is possible to enable wireless connection by the first connection information 121 that can be acquired from the radio tag 30 and change the second connection information 122 used for the wireless connection.

The image output apparatus 10 includes the operation panel 107 functioning as the receiving unit 18 for receiving an instruction for a change of the second connection information 122. The control program of the image output apparatus 10 functions as the changing unit 13 for changing the second connection information 122 on the basis of the instruction received by the receiving unit 18. When the control program changes the second connection information 122, the first connection information 121 is not changed. Therefore, it is possible to keep a state in which the information processing apparatus 20, which acquires the first connection information 121 from the radio tag 30, is capable of performing wireless connection to the image output apparatus 10.

When an access from the image output apparatus 10 is received by the IF section 104 using the first connection information 121, the control program of the image output apparatus 10 functions as an access point of the wireless LAN to perform wireless connection to the image putout apparatus 10.

The control program of the image output apparatus 10 can display, with the projecting unit 106, an image based on image data received by the wireless communication unit 11.

Further, the image output apparatus 10 may include the radio tag 108 functioning as the radio tag 15 that retains the first connection information 121. In this case, the first connection information 121 that can be acquired from the radio tag 30 is retained in the radio tag 108. Consequently, it is possible to more easily perform wireless connection using the first connection information 121.

The information processing system 1 includes the image output apparatus 10 and the information processing apparatus 20. The image output apparatus 10 and the information processing apparatus 20 establish wireless LAN connection. The information processing apparatus 20 transmits the content data 291. The image output apparatus 10 receives the content data 291 and displays an image based on the content data 291. Consequently, the information processing apparatus 20 can perform wireless connection to the image output apparatus 10 and transmit the content data 291 to the image output apparatus 10 and can change the second connection information 122 used for the wireless connection by the image output apparatus 10.

4. Modifications

The invention is not limited to the embodiment explained above. Various modified implementations are possible. Several modifications are explained below. Two or more of the modifications may be used in combination.

4-1. Modification 1

The image output apparatus 10 is not limited to the configuration for executing, with the multi-SSID function, the function of the wireless LAN access point based on the first connection information 121 and the function of the wireless LAN access point based on the second connection information 122.

For example, when another wireless LAN access point is present in a range in which communication of the wireless LAN is possible, the image output apparatus 10 maybe connected to the wireless LAN access point as a client. That is, the image output apparatus 10 is connected to an access point as a wireless LAN client by the wireless LAN interface of the IF section 104. In this case, the image output apparatus 10 can establish connection in response to an access of the information processing apparatus 20 based on the first connection information 121. That is, when the image output apparatus 10 functions as the wireless LAN client to execute communication through the wireless LAN interface of the IF section 104, the image output apparatus 10 functions as the wireless LAN access point based on the first connection information 121. When the image output apparatus 10 functions as the wireless LAN client to execute communication, the image output apparatus 10 uses the second connection information 122 in the IF section 104. On the other hand, the image output apparatus 10 uses the first connection information 121 in the function of the wireless LAN access point. Since SSIDs, passphrases, and the like are different, the function of the client and the function of the access point do not interfere with each other. In this configuration, since the image output apparatus 10 functions as the wireless LAN client to perform communication, the image output apparatus 10 can execute communication with other wireless LAN clients connected to the same wireless LAN access point. For example, the image output apparatus 10 can be connected to a wireless LAN, to which a plurality of PCs are connected, as a wireless LAN client, receive image data from a PC, which is another wireless LAN client, and display the image data. The image output apparatus 10 may be controlled by a function of an application program executed by a PC to execute switching of a video source, a start and an end of display, sound volume adjustment, and the like. In such a use, the connection information of the image output apparatus 10 needs to be changed according to setting of a wireless LAN access point to which the image output apparatus 10 is connected. However, the image output apparatus 10 can update the second connection information 122. Therefore, the image output apparatus 10 can be easily connected to any wireless LAN access point. While the image output apparatus 10 is caused to operate as the wireless LAN client, the image output apparatus 10 can respond to an access of the information processing apparatus 20 that reads connection information from the radio tag 30.

4-2. Other Modifications

Functions of the image output apparatus 10 are not limited to the functions illustrated in FIG. 2. A part of the functions illustrated in FIG. 2 may be omitted. The hardware configuration of the image output apparatus 10 is not limited to the hardware configuration illustrated in FIG. 3. The image output apparatus 10 may include any hardware configuration as long as requested functions can be realized. The wireless reader/writer 21 may be a radio reader not having a writing function.

The display apparatus is not limited to the projector and may be a direct-view display. The image output apparatus 10 is not limited to the display apparatus explained in the embodiment. The image output apparatus 10 may be an image forming apparatus such as a printer. In this case, data transmitted from the information processing apparatus 20 to the image output apparatus 10 is data of an image to be printed.

Functions of the information processing apparatus 20 are not limited to the functions illustrated in FIG. 2. A part of the functions illustrated in FIG. 2 may be omitted.

Software for realizing the functions of the information processing apparatus 20 is not limited to the software explained in the embodiment. Information included in the connection information is not limited to the information illustrated in the embodiment.

A hardware configuration for realizing the functions of the information processing apparatus 20 is not limited to the hardware configuration explained with reference to FIG. 5. The information processing apparatus 20 may include any hardware configuration as long as requested functions can be realized.

A computer program executed in at least one of the image output apparatus 10 and the information processing apparatus 20 may be provided in a state in which the computer program is stored in a computer-readable recording medium such as a magnetic recording medium (a magnetic tape, a magnetic disk (an HDD or an FD (Flexible Disk)), etc.), an optical recording medium (an optical disk (a CD (Compact Disk) or a DVD (Digital Versatile Disk)), etc.), a magneto-optical recording medium, or a semiconductor memory (a flash ROM, etc.). The computer program may be downloaded through a network such as the Internet.

What is claimed is:

1. A display apparatus comprising:
   a display section;
   a wireless communication section configured to perform wireless connection to an external apparatus using first connection information that can be acquired from an external radio tag;
   a storing section configured to store the first connection information and second connection information different from the first connection information; and
   a changing unit configured to
      change the second information stored by the storing section and
      prevent the first connection information stored by the storing section from being changed based on user operation of the display apparatus,
   wherein the wireless communication section is capable of performing the wireless connection to the external apparatus or another external apparatus using the second connection information.

2. The display apparatus according to claim 1, further comprising:
   a receiving section configured to receive an instruction for the change of the second connection information.

3. The display apparatus according to claim 1, wherein, when receiving an access from the external apparatus using the first connection information, the wireless communication section functions as an access point of a wireless LAN to perform the wireless connection to the external apparatus.

4. The display apparatus according to claim 3, wherein the wireless communication section performs wireless LAN connection to the external apparatus as an access point using the first connection information and performs the wireless LAN connection to an external wireless LAN access point using the second connection information.

5. The display apparatus according to claim 1, wherein the display section displays an image based on image data received by the wireless communication section.

6. The display apparatus according to claim 1, further comprising a radio tag configured to retain the first connection information.

7. A display system comprising:
   a display apparatus; and
   an information processing apparatus, wherein
   the display apparatus includes:
      a display section;
      a first wireless communication section configured to perform wireless connection to the information processing apparatus using first connection information;

a storing section configured to store the first connection information and second connection information different from the first connection information; and
a changing unit configured to
change the second information stored by the storing section and
prevent the first connection information stored by the storing section from being changed based on user operation of the display apparatus,
the display section displays an image based on image data received from the information processing apparatus by the first wireless communication section,
the first wireless communication section is capable of performing the wireless connection to the information processing apparatus using the second connection information, and
the information processing apparatus includes:
a wireless reader/writer configured to read the first connection information from a radio tag;
a second wireless communication section configured to perform wireless connection to the display apparatus using the first connection information read by the wireless reader/writer; and
a transmitting section configured to transmit image data to the display apparatus with the second wireless communication section.

8. A control method for a display apparatus comprising:
performing, by a display apparatus including a display section, wireless connection to an external apparatus using first connection information that can be acquired from an external radio tag and stored by the display apparatus;
performing the wireless connection to the external apparatus or another external apparatus using second connection information different from the first connection information;
changeably retaining the second connection information; and
preventing, by the display apparatus, the first connection information stored by the display apparatus from being changed based on user operation of the display apparatus.

9. The display apparatus according to claim 1, wherein the external radio tag is external to and provided separately from both the display apparatus and the external apparatus.

* * * * *